April 27, 1965     B. O. KAPPELMANN ETAL     3,180,290
PLASTIC SHEET LAYING AND PLANTING MACHINE
Filed Aug. 13, 1962                            4 Sheets-Sheet 1
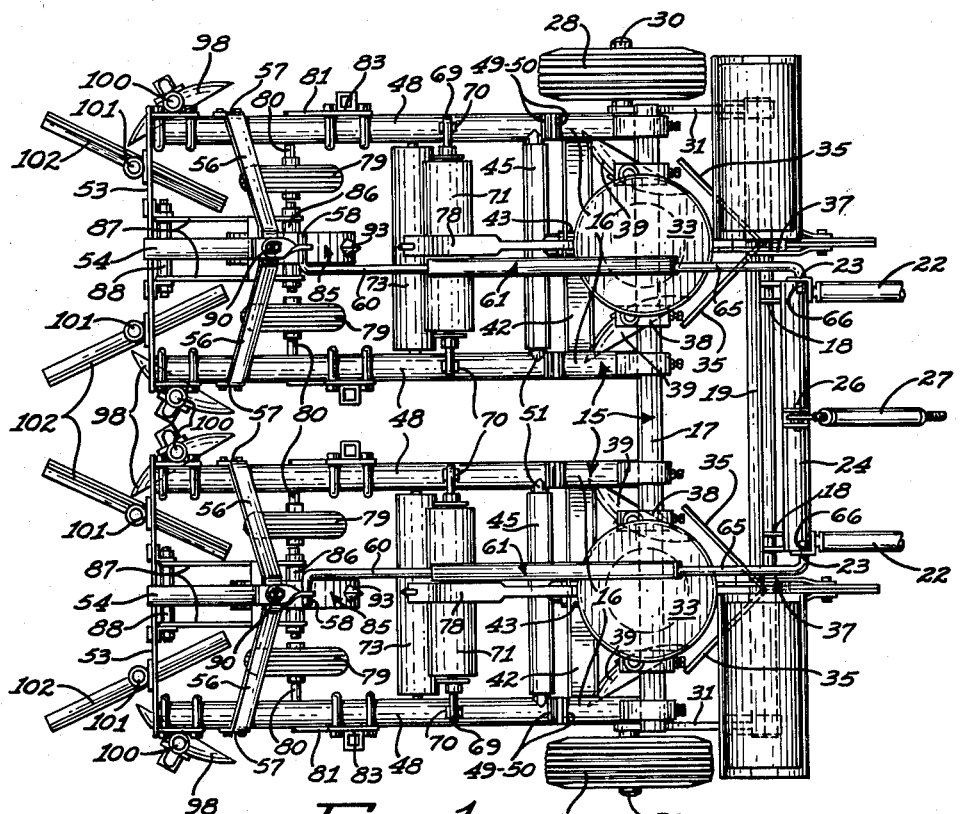
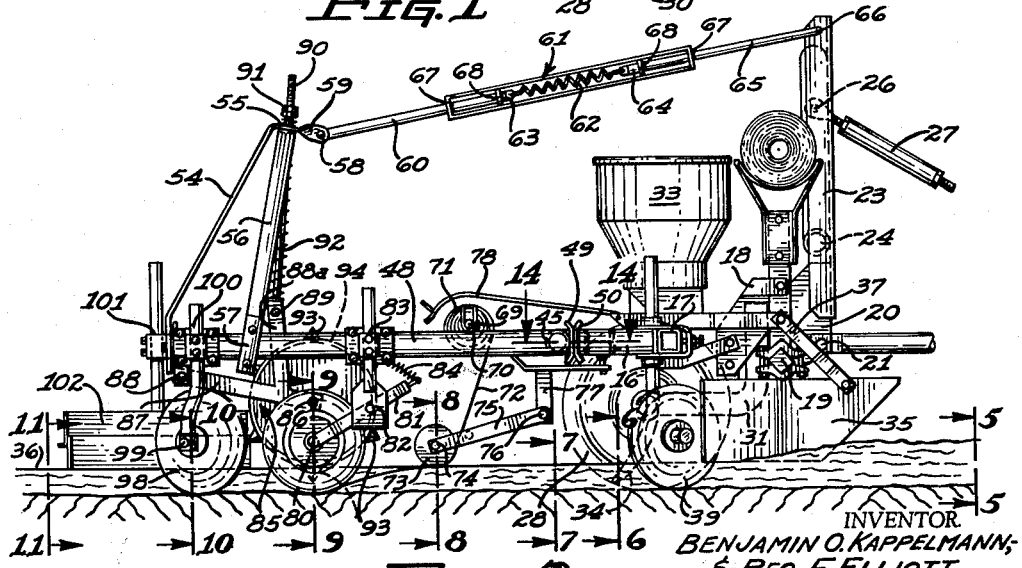
INVENTOR.
BENJAMIN O. KAPPELMANN;
$-REO F. ELLIOTT.
BY
ATTORNEY.

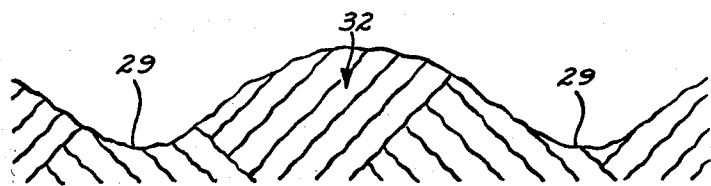
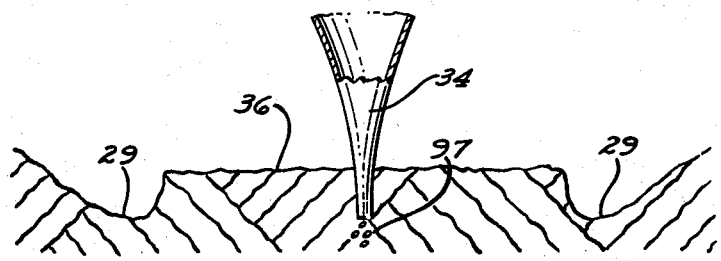
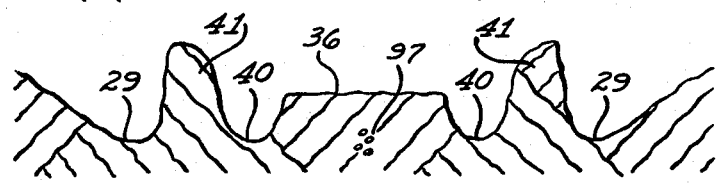
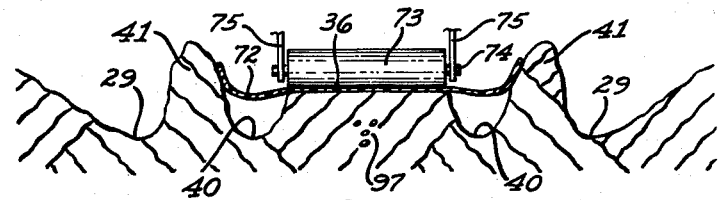
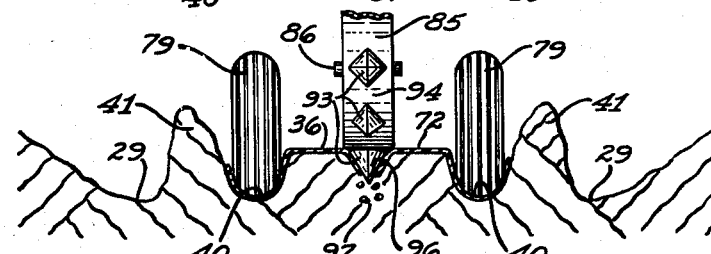
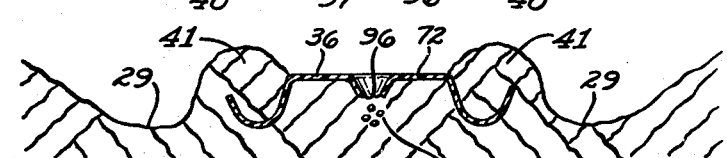
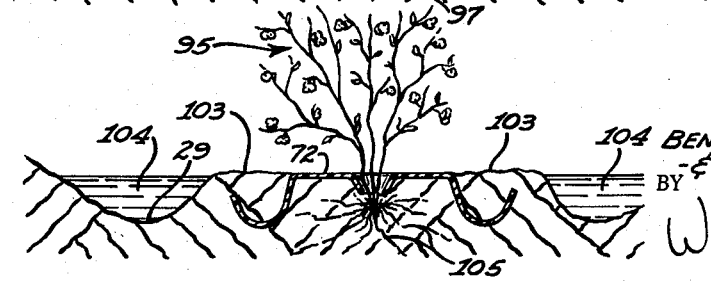

April 27, 1965  B. O. KAPPELMANN ETAL  3,180,290
PLASTIC SHEET LAYING AND PLANTING MACHINE
Filed Aug. 13, 1962  4 Sheets-Sheet 4

INVENTOR.
BENJAMIN O. KAPPELMANN,
-&- REO F. ELLIOTT.
BY
Willard S. Grunow
ATTORNEY

United States Patent Office 3,180,290
Patented Apr. 27, 1965

3,180,290
PLASTIC SHEET LAYING AND PLANTING MACHINE
Benjamin O. Kappelmann, Scottsdale, and Reo F. Elliott, Chandler, Ariz., assignors to Precision Agricultural Machinery Company, Phoenix, Ariz., a corporation of Arizona
Filed Aug. 13, 1962, Ser. No. 216,637
2 Claims. (Cl. 111—85)

This invention pertains to seed planting apparatus and is particularly directed to a method and apparatus for applying a plastic sheet to and planting seed in a plant row of a field.

One of the objects of this invention is to seed and cover a plant row with a plastic sheet so as to control the location and position of the plants along a plant row.

Another object of this invention is to plant seed and apply a plastic sheet over the planted seeds having a plurality of longitudinally spaced perforations through which the plants grow.

An object of this invention is to provide a seeded plant row with a perforated plastic sheet through which the plants grow whereby weeds and other foreign growth is eliminated and controlled.

An object is to provide a perforated plastic sheet for a plant row which holds and conserves moisture in the plant row adjacent the roots of the plants.

Another object is to provide a plastic film over a prepared and seeded plant row so as to reduce field maintenance in cultivating the rows and to prevent wind and rain erosion of the plant rows.

A further object is to provide a perforated plastic shield over a plant row to protect seedlings from excessive rainfall, particularly in arid country irrigated fields, which might bring alkali to the surface and form crusted soil to damage and kill the seedlings during early growth.

It is also an object to provide a plastic strip for a plant row from which the fallen crop units from the plants, such as the cotton from cotton plants during initial picking, can be easily and efficiently picked up without contamination by the soil or trash in the field surface.

And it is a further object to provide a procedure and apparatus to prepare a flat-topped plant row, plant seed in said plant row, stretch and secure a plastic sheet over said seeded plant row, and form perforations in said sheet through which the plants grow.

Further features and advantages of this invention will appear from a detailed description of the drawings in which:

FIG. 1 is a plan view of a two-row machine for plastic sheet laying and planting incorporating the features of this invention.

FIG. 2 is a left hand side elevation of the apparatus shown in FIG. 1.

FIG. 5 is an enlarged diagrammatic section of the plant row on the line 5—5 of FIG. 2.

FIG. 6 is an enlarged diagrammatic section of the plant row on the line 6—6 of FIG. 2.

FIG. 7 is an enlarged diagrammatic section of the plant row on the line 7—7 of FIG. 2.

FIG. 8 is an enlarged diagrammatic section of the plant row on the line 8—8 of FIG. 2.

FIG. 9 is an enlarged diagrammatic section of the plant row on the line 9—9 of FIG. 2.

FIG. 10 is an enlarged diagrammatic section of the plant row on the line 10—10 of FIG. 2.

FIG. 11 is an enlarged diagrammatic section of the plant row on the line 11—11 of FIG. 2.

Figure 3:
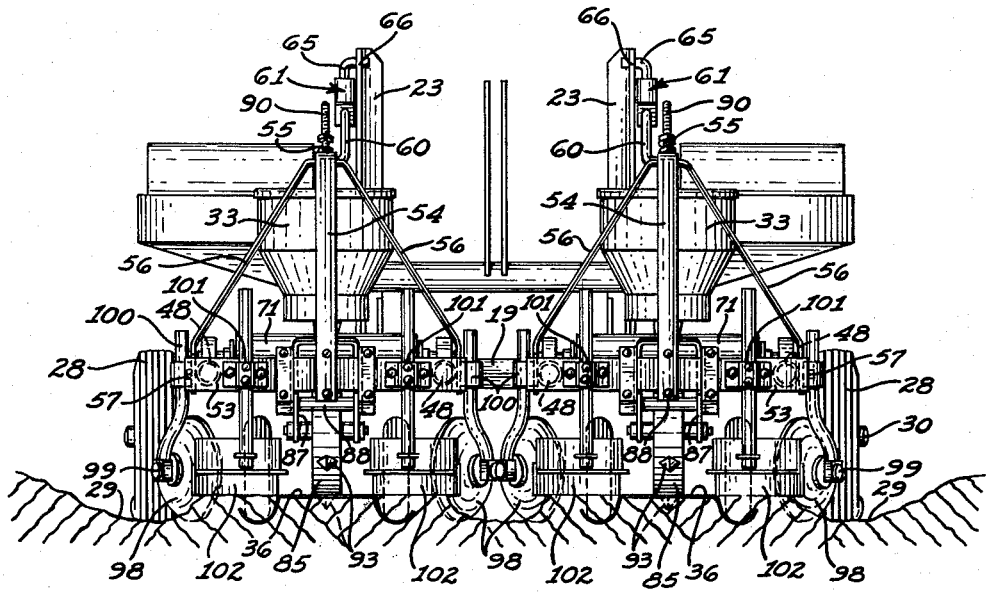
FIG. 3 is a rear elevation of the machine shown in FIG. 1.
Figure 4:
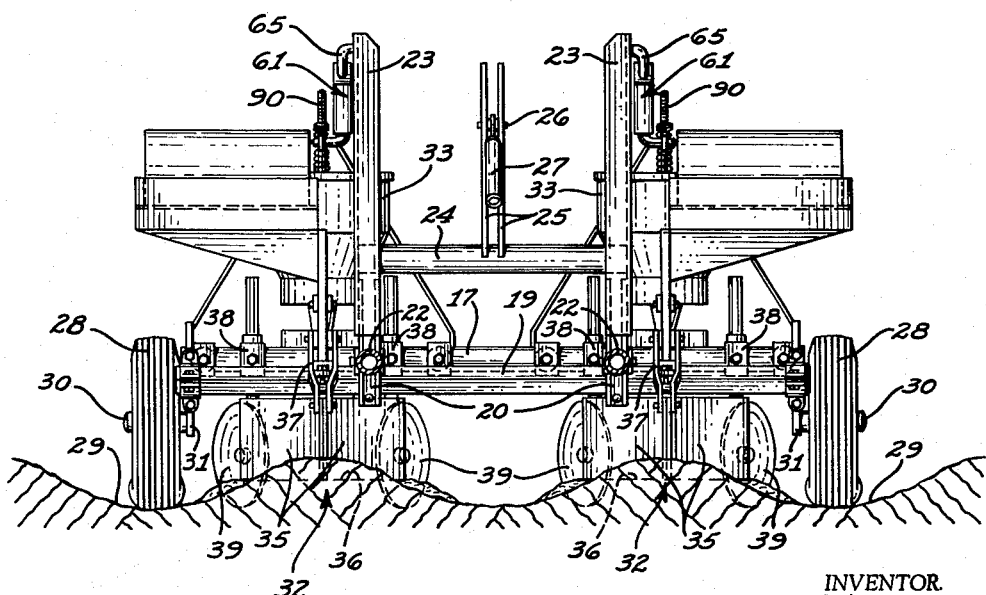
FIG. 4 is a front elevation of the machine shown in FIG. 1.

As an example of one embodiment of this invention, there is shown a plastic sheet laying and planting machine comprising a main frame 15 having two pairs of rearwardly extending side rails 16 suitably fixed to the cross bar 17. The cross bar 17 is fixed by suitable brackets 18 to the transverse elevating bar 19 to which is suitably clamped the brackets 20 in turn pivotally mounted by the pins 21 to the outer ends of the usual lower elevating arms 22 of a tractor. Fixed to the brackets 20 are the upwardly extending members 23 tied together intermediate their ends by the cross piece 24 to the mid portion of which is fixed the upstanding lever 25 which is pivotally connected by a pin 26 to the outer end of the usual upper elevating arm 27 of a tractor so that the described frame 15 can be raised and lowered from the tractor and properly positioned relative to the ground surface of the field.

Ground engaging wheels 28 roll in the furrows 29 and are journaled on suitable axles 30 carried on brackets 31 adjustably clamped to the outer ends of the transverse elevating tie bar 19 so as to vertically position the frame 15 with respect to the ground surface.

Since the machine illustrated is adapted to operate upon two plant rows 32 simultaneously with identical apparatus a description of the apparatus for one row will suffice for both. Mounted on the frame 15 for each plant row 32 are conventional seed planters 33 having the usual discharge tubes 34 for injecting the seed and fertilizer into the plant row. Preceding the discharge tubes 34 as the tractor moves forward is the angularly disposed scraper blades 35 which form the initial level top surface 36 and which blades 35 are fixed by appropriate clamps 37 on the transverse elevating tie bar 19. Mounted on the cross bar 17 of the frame 15 by suitable adjustable clamps 38 immediately behind the scraper blades 35 are the angularly disposed rotary harrow discs 39 which scoop soil away from the plant row 32 to form the plastic sheet locking trenches 40 and the associated berms 41, FIG. 7, along the outer edges of the trenches 40.

Figure 14:
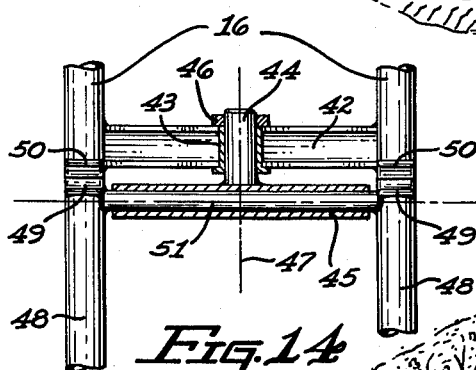
FIG. 14 is an enlarged fragmentary section on the line 14—14 of FIG. 2.

Referring particularly to FIGS. 1, 2 and 14, the rearward ends of the pairs of side rails 16 are fixed to the transverse pivot rail 42 intermediate the ends of which is formed a bearing 43 in which is pivotally carried the trunnion 44 fixed to the intermediate portion of the tubular member 45, the trunnion 44 being held against axial movement in the bearing 43 by a suitable lock nut 46 so that the tubular member may rock about the horizontal longitudinally extending axis 47 on the frame 15.

Extending rearwardly from the side rails 16 is the auxiliary frame comprising the side arms 48 having abutment plates 49 on their forward ends adapted to slidingly engage mating abutment plates 50 fixed on the rearward ends of the side rails 16. The forward ends of the side arms 48 are rigidly tied together by the rock shaft 51 which is pivotally mounted in the tubular member 45 confined axially between the side arms 48 so that the pairs of side arms 48 for each plant row may swing up and down at their rearward ends about the transverse horizontal axis 52 while the sliding abutment engagement of the plates 49–50 controls and absorbs sidewise angular displacement of the side arms 48 relative to the bearing 43 and side rails 16.

The rear ends of the side arms 48 are tied together by the tie plate 53. Upstanding from intermediate the ends thereof is the tie bar 54 which is fixed to the apex 55 of a strap member 56 having its lower ends rigidly clamped at 57 to the outer ends of the side arms 48 forming a rigid structure on the outer end of said arms 48. Pivotally connected by a pin 58 to a forward extension 59 of the tie bar 54 is one element 60 of a yielding tension member 61 for controlling the movement of the auxiliary frame in response to irregularities in the ground surface having a tension spring 62 connected to the forward end 63 of the element 60 and having its other end connected to the rearward end 64 of the other element 65 which is pivotally connected at 66 to the top ends of the upwardly extending members 23. End stop pieces 67 of the member 61 engage stop collars 68 when arms 27 are operated to lift the frame clear of the ground during travel while the ends 63–64 of the member 60–65 float relative to each other under tension of the spring 62 during normal operation of the apparatus.

A transverse plastic sheet supply roll shaft 69 is journaled in suitable U-shaped bearings 70 fixed on top of the side arms 48 upon which is mounted a roll of plastic sheet material 71 which unwinds downwardly at 72 and passes under and rearwardly of the hold-down roller 73 which is journaled on a suitable shaft 74 on the outer ends of the pivot arms 75 which in turn are pivotally mounted at 76 on the lower ends of the brackets 77 fixed to the side arms 48. By this arrangement, FIG. 8, the plastic sheet 72 is pressed against the top surface 36 of the plant row 32 and over the locking trenches 40 as the tractor moves forward. Unwrapping tension is provided in the plastic sheet, if required, by a tensioning member 78 carried on the frame 15 and slidingly engaging the periphery of the roll of plastic sheet to effect a proper tensioning and smooth flow of the sheet 72 under the hold-down roller on to the plant row surface 36.

Following immediately behind the hold-down roller 73, FIGS. 2 and 9, are the locking trench wheels 79 which roll the edges of the plastic sheet 72 into the trenches 40 while at the same time laterally stretching the plastic sheet over the top surface 36 of the plant row. The locking trench wheels 79 are journaled on suitable axles 80 carried on the outer ends of the arms 81 which are pivotally mounted at 82 on a suitable support bracket 83 suitably clamped to the side arms 48. A tension spring 84 is connected between the support bracket 83 and arm 81 to provide the desired downward pressure of the locking trench wheels against the plastic sheet 72 to force it into the locking trenches 40.

In instances where non-perforated plastic sheet 72 is utilized, a perforating roller 85, FIGS. 2 and 9, is utilized which is journaled on a suitable transverse shaft 86 carried in the outer ends of the arms 87 pivotally mounted on a suitable rockshaft 88 carried on the tie plate 53. An upstanding integral bridge piece 88a across the arms 87 is pivotally connected by a pin 89 to an eyebolt 90 which passes up through a clearance hole in the apex 55 of the strap member 56 and has lock nuts 91 on the upper end to limit downward travel of the eyebolt 90 and arms 87 while a compression spring 92 around the eyebolt 90 engages the apex 55 of the strap member 56 and the top end of the bridge piece 88 to normally yieldingly force the arms 87 and perforating roller downwardly. The perforating roller 85 is provided with a series of radially extending perforating projections 93 circumferentially spaced about the periphery 94 of the perforating roller 85, a distance equal to the desired spacing of the plants 95 along the plant row 32. As the perforating roller proceeds down the center of the plastic strip it punches a series of accurately spaced holes 96 directly above the seed 97 that has been previously planted. It will be further noted that the perforating projections in passing through the plastic sheet, at the same time that the locking trench wheels apply lateral stretching to the plastic sheet, serve to pin down and hold the plastic sheet centered on the top surface 36 of the plant row for accurate positioning of the plastic sheet on the plant row.

Following immediately behind the locking trench wheels 79 are the filler harrow discs 98 which turn the locking berms 41 into the locking trenches 40 on top of the edges of the plastic sheet 72 which have been previously pressed into the trench 40 by the wheels 79 so as to securely lock down and seal the side edges of the plastic sheet along the plant row 32, FIG. 10. The filler harrow discs 98 are journaled on suitable shafts 99 fixed on the lower ends of suitable supporting brackets 100 suitably clamped to the side arms 48.

Mounted on suitable brackets 101 carried on the tie plate 53 are the final leveling scraper blades 102 which level off the excess of the berms 41 to the height 103 of the plastic sheet 72 on the finally prepared plant row 32, FIG. 11. Irrigation water 104 is then supplied in the furrows 29 each side of the plant row 32 whereby it seeps in the soil and up under the plastic sheet to properly supply moisture to the plant roots 105.

Figure 12:
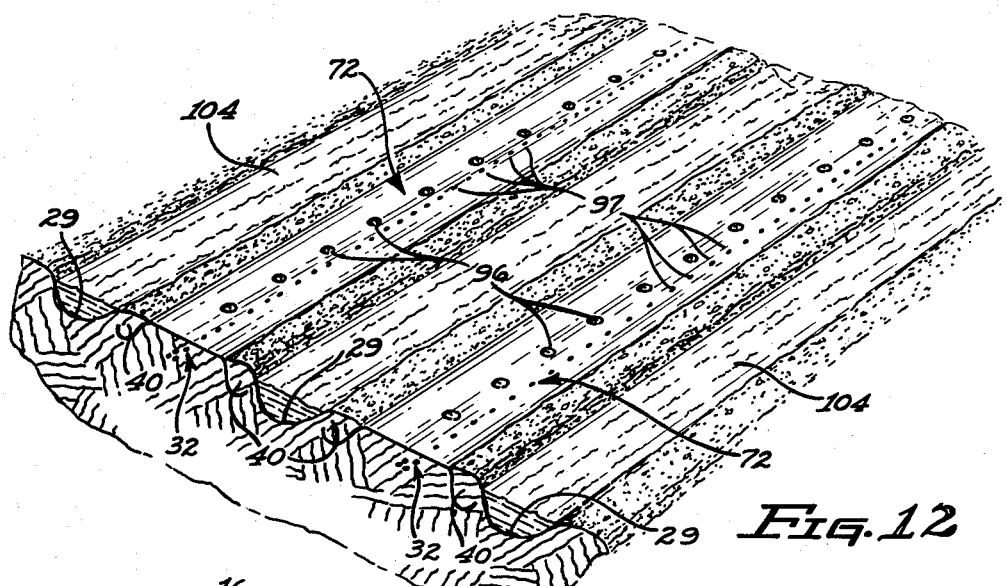
FIG. 12 is an enlarged fragmentary perspective view showing the field immediately after seeding and placement of the plastic sheet.
Figure 13:
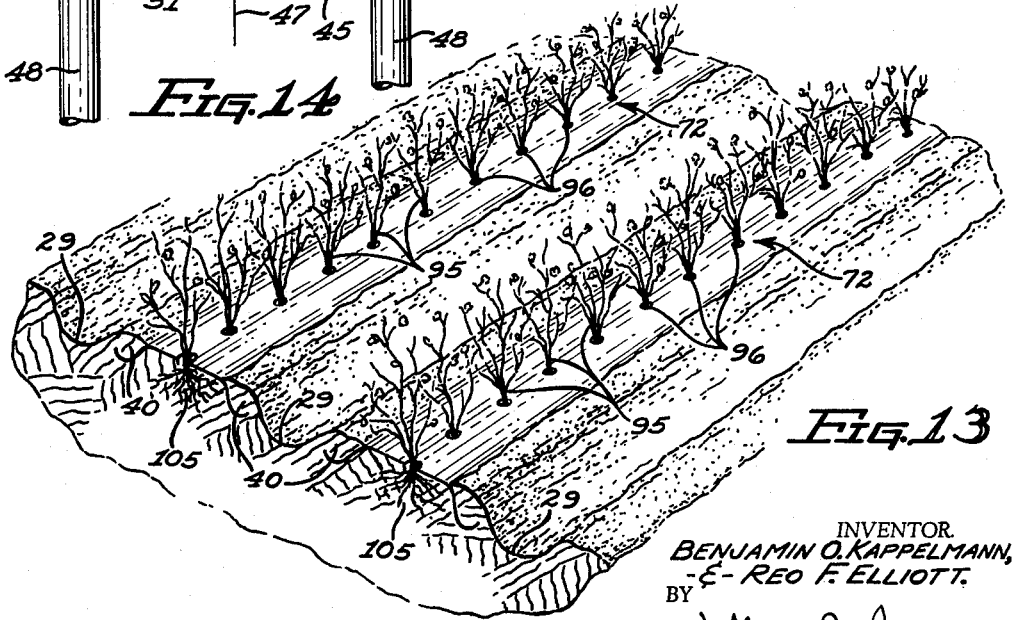
FIG. 13 is a view similar to FIG. 12 showing the field with the mature plants extending upward through the plastic sheet.

FIG. 12 shows the condition of the field after the above described operations with each plant row covered by the locked in plastic sheet 72 having a series of accurately spaced perforations 96 extending along a row of planted seed 97. In FIG. 13 is shown the conditions after the plants 95 have matured in which each plant is widely separated from the other at accurately spaced longitudinal positions along the plant row with elimination of extraneous unwanted in-between plants and the absence of weeds and other foreign growth adjacent the desired plants resulting in low maintenance and easy harvesting of the crop. It is to be understood that those portions of the machine utilized for applying the plastic sheet to the plant row may be utilized separately without the requiring the seeding apparatus or the perforating devices for the plastic sheet as desired.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A plastic sheet laying and planting machine comprising in combination:
   (a) a frame adapted to be mounted on a tractor,
   (b) ground contacting wheels journaled on said frame for supporting said frame above ground level,
   (c) scraper blades fixed on said frame for initially leveling a rough surface on a plant row to be operated upon,
   (d) harrow disc means fixed on said frame adapted to form plastic sheet locking trenches along each side of said initially leveled surface,
   (e) means for sowing seed down the middle of said leveled surface,
   (f) a plastic sheet hold-down roller pivotally mounted for vertical swinging about a transverse axis on said frame,
   (g) a pair of laterally spaced locking trench wheels pivotally mounted for vertical movement on said frame of rearwardly said hold-down roller and adapted to roll on top of said plastic sheet adjacent the edges thereof and in said trenches,
   (h) a perforating roller pivotally mounted on said frame and engaging said plastic sheet at a point between said laterally spaced locking trench wheels where said wheels engage said sheet to perforate said plastic sheet at longitudinally spaced intervals above said row of sowed seed.

2. A plastic sheet laying and planting machine comprising in combination:
  (a) a frame adapted to be mounted on a tractor,
  (b) ground contacting wheels journaled on said frame for supporting said frame above ground level,
  (c) scraper blades fixed on said frame for initially leveling a rough surface on a plant row to be operated upon,
  (d) harrow disc means fixed on said frame adapted to form plastic sheet locking trenches along each side of said initially leveled surface,
  (e) means for sowing seed down the middle of said leveled surface,
  (f) a plastic sheet hold-down roller pivotally mounted for vertical swinging about a transverse axis on said frame,
  (g) a pair of laterally spaced locking trench wheels pivotally mounted for vertical floating movement on said frame rearwardly of said hold-down roller and adapted to roll in said trenches on top of and inwardly adjacent the edges of said plastic sheet,
  (h) a perforating roller pivotally mounted on said frame and engaging said plastic sheet at a point between said spaced locking trench wheels to perforate said plastic sheet at longitudinally spaced intervals above said row of sowed seed,
  (i) and harrow discs on said frame behind said locking trench wheels for filling soil on said sides of said plastic sheet forced in said trenches so as to lock said sheet on said plant row leveled surface.

References Cited by the Examiner

UNITED STATES PATENTS

| | | | |
|---|---|---|---|
| 1,436,139 | 11/22 | Bailey | 47—9 |
| 1,562,353 | 11/25 | McGuire et al. | 47—9 |
| 1,735,568 | 11/29 | Gallagher | 280—492 |
| 1,787,902 | 1/31 | Herfort | 47—9 |
| 2,189,170 | 2/40 | Gaussoin | 280—494 |
| 2,346,330 | 4/44 | Ratcliff | 111—52 |
| 2,690,145 | 9/54 | Romain | 111—3 |
| 2,740,233 | 4/56 | Reynolds | 47—9 |
| 2,890,665 | 6/59 | Kang | 111—3 |
| 2,961,979 | 11/60 | Stanley et al. | 111—3 |
| 2,981,213 | 4/61 | O'Neil | 111—52 |
| 3,023,717 | 3/62 | Cline | 111—81 |

FOREIGN PATENTS

| | | |
|---|---|---|
| 105,875 | 11/38 | Australia. |
| 917,006 | 9/46 | France. |

OTHER REFERENCES

"Texas Agricultural Progress," vol. 7, No. 4, July, August 1961, (Pages 9 and 10 relied on along with 2 sheets of printed material describing details of the planting frame.)

ABRAHAM G. STONE, *Primary Examiner.*
WILLIAM A. SMITH III, *Examiner.*